United States Patent
Lee et al.

(10) Patent No.: US 7,331,694 B2
(45) Date of Patent: *Feb. 19, 2008

(54) ILLUMINATING UNIT AND PROJECTION TYPE IMAGE DISPLAY APPARATUS USING THE SAME

(75) Inventors: Kye-hoon Lee, Suwon-si (KR); Won-yong Lee, Suwon-si (KR); Young-chol Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

This patent is subject to a terminal disclaimer.

(21) Appl. No.: 11/268,616

(22) Filed: Nov. 8, 2005

(65) Prior Publication Data
US 2006/0203486 A1  Sep. 14, 2006

(30) Foreign Application Priority Data
Mar. 8, 2005  (KR) ............... 10-2005-0019066

(51) Int. Cl.
F21V 5/04  (2006.01)
(52) U.S. Cl. ............. 362/335; 362/231; 362/237; 362/268; 362/551; 362/555; 362/600; 362/610; 362/612; 362/615; 362/628; 362/800; 385/33; 385/34
(58) Field of Classification Search .......... 362/231, 362/237, 612, 601, 628, 340, 610, 551, 268, 362/555, 600, 545, 800, 615, 335; 385/33–35
See application file for complete search history.

(56) References Cited

U.S. PATENT DOCUMENTS

| | | | |
|---|---|---|---|
| 5,987,043 A * | 11/1999 | Brown et al. ............. | 372/36 |
| 6,271,169 B1 * | 8/2001 | Kourtakis et al. ......... | 502/305 |
| 6,929,390 B2 * | 8/2005 | Amano ..................... | 362/545 |
| 7,040,767 B2 * | 5/2006 | Lee et al. .................. | 353/99 |
| 7,059,731 B2 * | 6/2006 | Lee et al. .................. | 353/99 |
| 7,070,311 B2 * | 7/2006 | Lee .......................... | 362/545 |
| 7,097,334 B2 * | 8/2006 | Ishida et al. ............... | 362/516 |

(Continued)

FOREIGN PATENT DOCUMENTS

JP  2003-157710 A  5/2003

(Continued)

*Primary Examiner*—Stephen F. Husar
*Assistant Examiner*—Meghan K. Dunwiddie
(74) *Attorney, Agent, or Firm*—Sughrue Mion, Pllc.

(57) ABSTRACT

An illuminating unit having a plurality of light emitting devices and collimators and a projection type image display apparatus using the same are provided. The illuminating unit includes: a plurality of light emitting devices which output light beams of predetermined wavelengths; a plurality of collimators, each having a parabolic reflection surface for reflecting the light beam in a predetermined direction, a mounting section for locating the light emitting device at the focal point of the parabolic reflection surface, a light output surface opposite to the parabolic reflection surface, and a light guide section for guiding the light beam reflected from the parabolic reflection surface to the light output surface; and one or more fixing members having two or more steps for mounting the light emitting devices and the collimators on their top surface. A plurality of light emitting devices and collimators are efficiently arranged in a small space. Therefore, thermal concentration can be reduced and heat can be effectively discharged.

26 Claims, 9 Drawing Sheets

U.S. PATENT DOCUMENTS

| | | | |
|---|---|---|---|
| 7,165,871 B2 * | 1/2007 | Takeda et al. | 362/538 |
| 7,182,497 B2 * | 2/2007 | Lee et al. | 362/555 |
| 2003/0090632 A1 | 5/2003 | Kim et al. | |
| 2007/0019429 A1 * | 1/2007 | Gasquet | 362/510 |

FOREIGN PATENT DOCUMENTS

| | | |
|---|---|---|
| JP | 2004-012620 A | 1/2004 |
| KR | 10-2003-0010048 A | 2/2003 |
| KR | 10-2003-0028308 A | 4/2003 |

* cited by examiner

ILLUMINATING UNIT AND PROJECTION TYPE IMAGE DISPLAY APPARATUS USING THE SAME

CROSS-REFERENCE TO RELATED PATENT APPLICATIONS

This application claims priority from Korean Patent Application No. 10-2005-0019066, filed on Mar. 8, 2005, in the Korean Intellectual Property Office, the disclosure of which is incorporated herein in its entirety by reference.

BACKGROUND OF THE INVENTION

1. Field of the Invention

The present invention relates to an illuminating unit and a projection type image display apparatus using the same and, more particularly, to an illuminating unit having an improved fixing member for mounting light sources and collimators and a projection type image display apparatus using the same.

2. Description of the Related Art

Typically, an illuminating unit includes a light source for outputting a light beam, an illuminating optical module such as a collimator for transferring the light beam output from the light source, and a fixing member for holding the light source and the illuminating optical module. The illuminating unit is usually employed in a projection type image display apparatus which displays images using a non-spontaneous light emitting display device such as a liquid crystal display panel (LCP) or a digital micro-mirror device (DMD). Recently, small, low-power illuminating units have been developed for projection type image display devices, employing small light emitting devices such as light emitting diodes (LEDs) and laser diodes as a light source.

FIG. 1 shows a conventional illuminating unit which uses LEDs. In this illuminating unit, an optical module is used to collimate the light beam output from the LEDs 1, to increase the effective light intensity by condensing the light beams output from the LEDs 1. In addition, because a typical LED emits less light than other light sources such as a metal halide lamp or a mercury lamp, a plurality of LEDs must be used, and these are arranged on a fixing member 3.

The fixing member is required to optimally hold the illumination optical module as well as the light emitting devices, and to effectively serve as a heat sink for the heat generated by the light emitting devices. Unfortunately, there has been no suggestion for satisfying this requirement.

SUMMARY OF THE INVENTION

The present invention provides an illuminating unit for holding a plurality of optical modules including small light emitting devices such as LEDs, collimators for reflecting the light beams output from the light emitting devices in a predetermined direction, and a fixing member having a structure capable of effectively, discharging the heat generated by the light emitting devices.

According to an aspect of the present invention, there is provided an illuminating unit comprising: a plurality of light emitting devices which output light beams of predetermined wavelengths; a plurality of collimators, each having a parabolic reflection surface for reflecting the light beams in a predetermined direction, a mounting section for locating a corresponding one of the light emitting devices at the focal point of the parabolic reflection surface, a light output surface opposite to the parabolic reflection surface, and a light guide section for guiding the light beams reflected from the parabolic reflection surface to the light output surface; and at least one fixing member having at least two steps for mounting thereon the light emitting devices and the collimators.

According to another aspect of the present invention, there is provided a projection type image display apparatus comprising: a plurality of illuminating units for outputting light beams of different wavelengths; at least an optical modulator for modulating the light beams from the illuminating units based on image data; and a projection lens unit for projecting and magnifying the light beams output from the optical modulator, wherein the illuminating unit comprises: a plurality of light emitting devices which output light beams of different wavelengths; a plurality of collimators, each having a parabolic reflection surface for reflecting the light beam in a predetermined direction, a mounting section for locating a corresponding one of the light emitting devices at the focal point of the parabolic reflection surface, a light output surface opposite to the parabolic reflection surface, and a light guide section for guiding the light beams reflected from the parabolic reflection surface to the light output surface; and at least one fixing member having at least two steps for mounting thereon the light emitting devices and the collimators.

The at least one fixing member may include a first fixing member having a first top surface and a second fixing member having a second top surface, and the first top surface may face the second top surface.

The light guide section may be a rectangular post having a rectangular cross-section.

The light output surfaces of the plurality of collimators may be on the same plane.

A length difference between light guide sections of the plurality of collimators mounted on neighboring steps may be equal to a horizontal interval between the light emitting devices mounted on neighboring steps.

The light output surfaces may meet each other without a gap.

A vertical interval between the light emitting devices mounted on neighboring steps may be equal to the thickness of the light guide section.

The interval between neighboring light emitting devices mounted on each step may be equal to the width of the light guide section.

The at least one fixing member may be made from a high thermal conductive material such as a metal.

A heat sink may be provided on the bottom surface of the at least one fixing member.

A bottom surface of the corresponding light emitting device may contact a top surface of a corresponding one of the steps without an air gap.

A heat transfer layer may be interposed between a substrate of the corresponding light emitting device and a top surface of a corresponding one of the steps.

Each of the light emitting devices comprises at least one of a light emitting diode (LED), a laser diode, an organic electroluminescent device, and a field emission device.

BRIEF DESCRIPTION OF THE DRAWINGS

The above and other features and advantages of the present invention will become more apparent by describing in detail exemplary embodiments thereof with reference to the accompanying drawings, in which.

DETAILED DESCRIPTION OF ILLUSTRATIVE, NON-LIMITING EMBODIMENTS OF THE INVENTION

Figure 1:
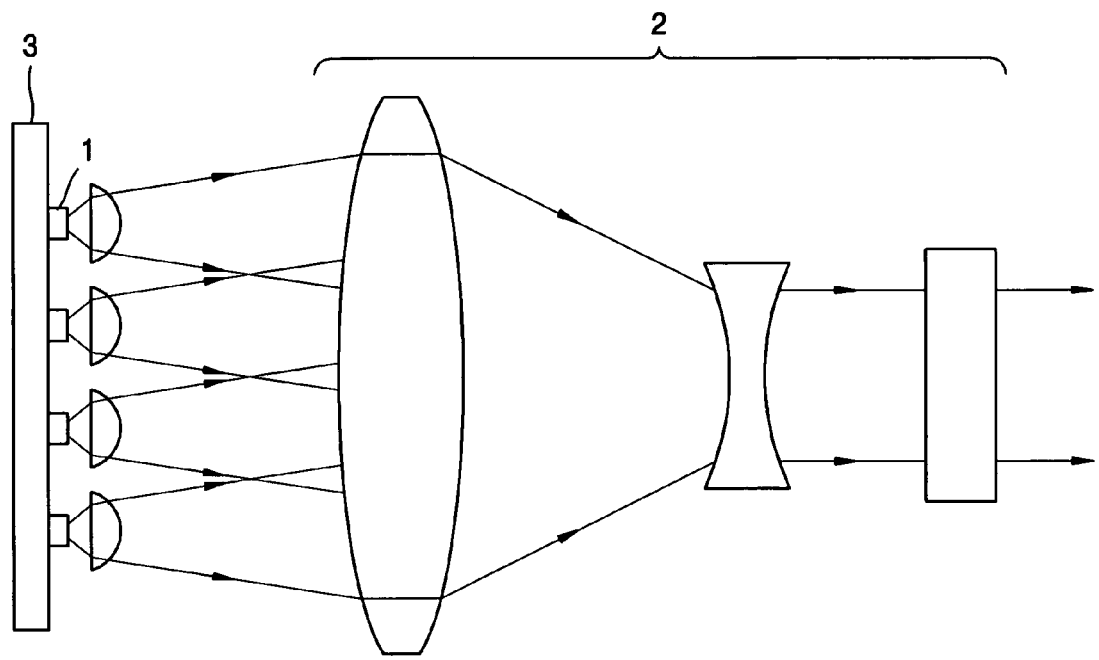
FIG. 1 illustrates a conventional illuminating unit using LEDs.
Figure 2:
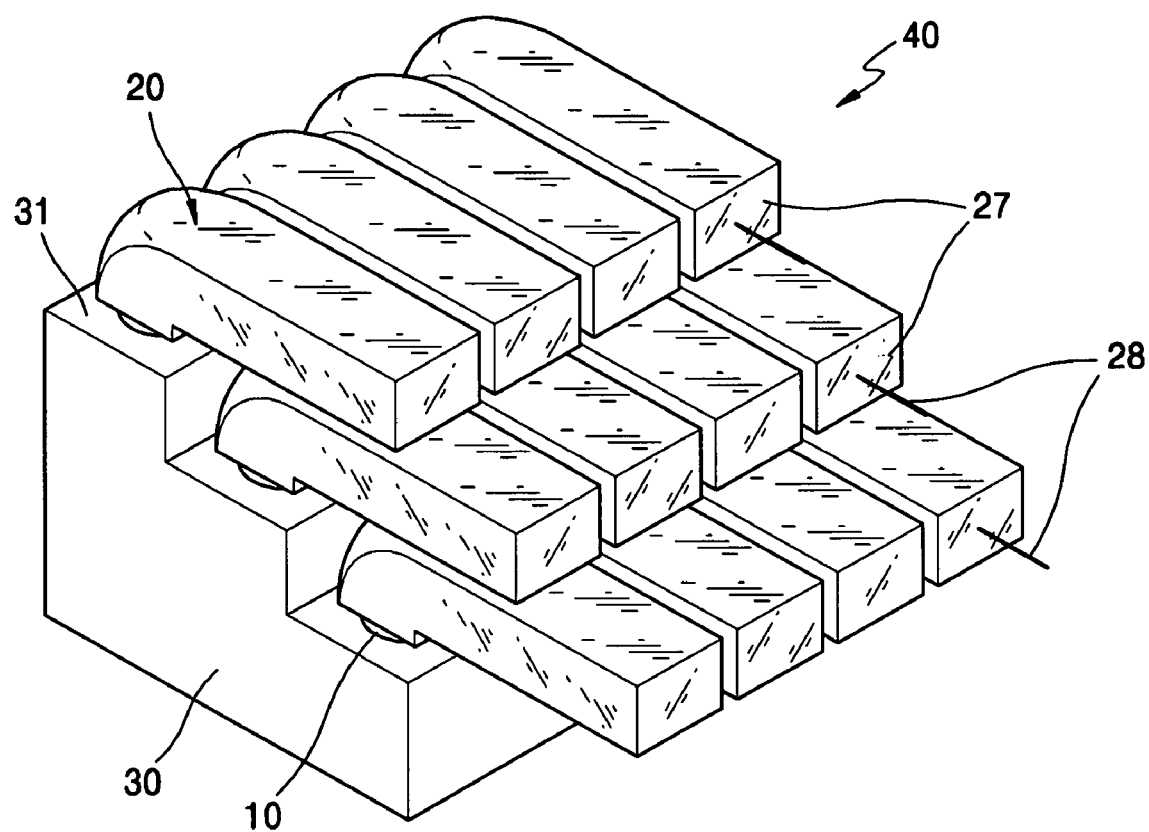
FIG. 2 is a perspective view of an example of an illuminating unit according to a first embodiment of the present invention.

FIG. 2 is a perspective view of an example of an illuminating unit according to a first embodiment of the present invention.

The illuminating unit 40 has a fixing member 30, a plurality of light emitting diodes (LEDs) 10, and collimators 20 coupled to the LEDs 10.

The fixing member 30 has a 3-step structure. The top surface 31 of each step is sufficiently large to mount the collimator 20. The LEDs 10 are installed on each top surface 31, and the collimator 20 covers the LED 10, so that the light beam output from the LED is collimated by the collimator 20. Further, a plurality of collimators 20 are arranged to guide the light beams to the same direction. That is, the collimators 20 are arranged in such a way that the normal vectors of the light output surfaces 27 of the collimators 20 are directed to the same direction.

Figure 3:
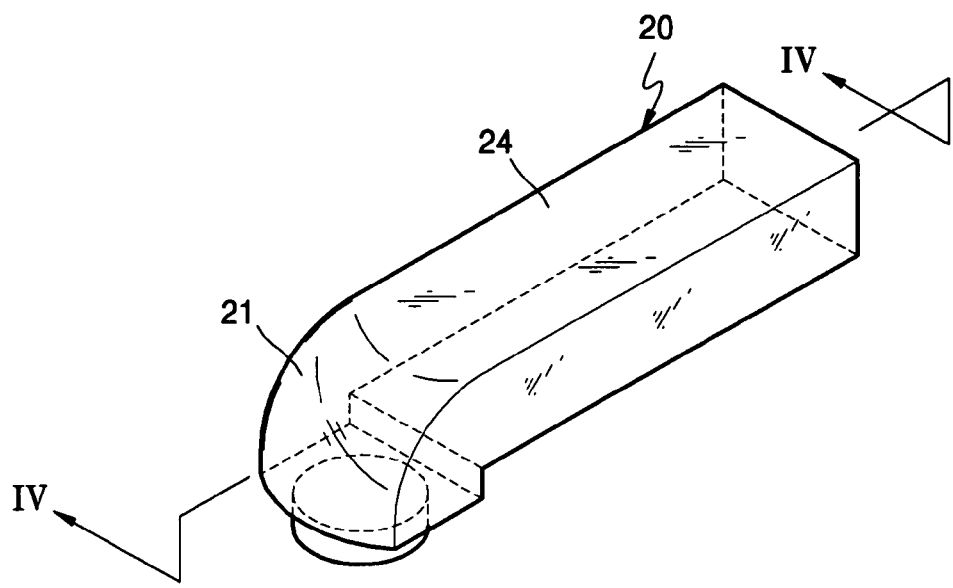
FIG. 3 is a perspective view of an example of an collimator of the present invention.
Figure 4:
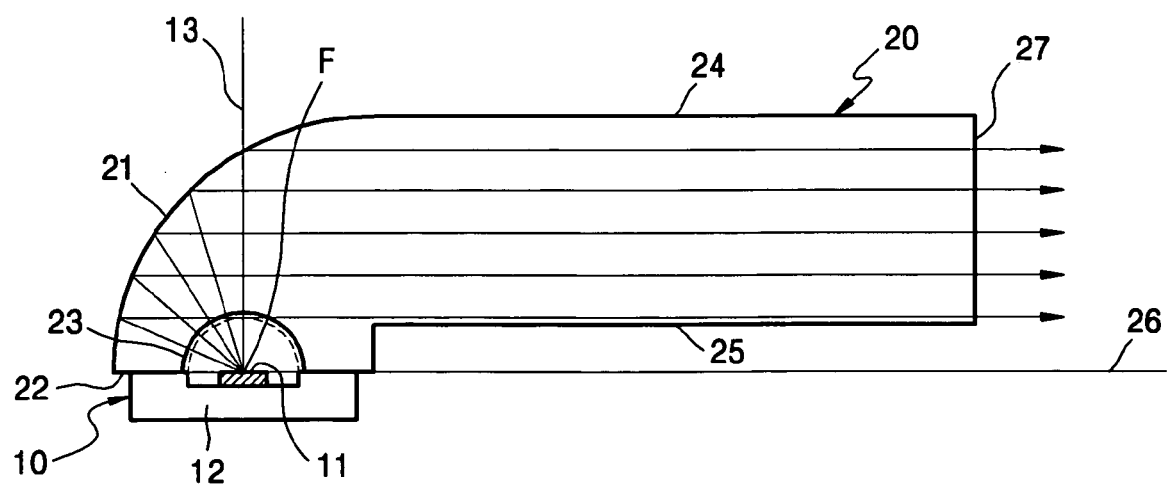
FIG. 4 is a cross-sectional view along a line IV-IV of FIG. 3.

The LEDs 10 and the collimators 20 will now be described in more detail with reference to FIGS. 3 and 4.

The LED 10 has an LED chip 11 mounted on a substrate 12. The collimator 20 covering the LED 10 has a parabolic reflection surface 21, a mounting section 22, a light guide section 24, and a light output surface 27.

The mounting section 22 faces the parabolic reflecting surface 21. The mounting section 22 may be a surface including a main axis 26 of the parabolic reflection surface 21, being parallel with a surface having the main axis 26, or being sloped in a predetermined angle against the surface including the main axis 26. The mounting section 22 has a concave portion 23 so that the LED can be located at the focal point of the parabolic reflection surface 21.

The light guide section 24 faces the parabolic reflection surface 21 in the other position than the mounting section 22, and is a post having a center axis parallel with the main axis 26. The cross-section of the light guide section 24 is rectangular so as to decrease the light emitting area of the illuminating unit having a plurality of collimators 20.

The light guide section 24 has a stepped surface 25 extended from the mounting section 22. The stepped surface 25 is parallel with the mounting section 22 but on a different level. However, the surface 25 of the light guide section 24 may be on the same level as the mounting section 22 without being stepped, depending on the optical design.

The parabolic reflection surface 21 is not necessarily strictly parabolic (i.e., the conic coefficient K of the parabolic surface is not required to be −1). The parabolic reflection surface 21 used in the present invention may be an aspherical surface having a conic coefficient K at least within the range of −0.4 to −2.5, preferably, but not necessarily, −0.7 to −1.6. The conic coefficient K for the parabolic reflection surface 21 may be optimally selected from the aforementioned range so as to collimate the light beams output from the LEDs 10 to within a radiation angle capable of effectively illuminating the light beams to an object. Hereinafter, it is assumed that the parabolic reflection surface 21 has a conic coefficient K=−1. Strictly speaking, since the LED chip 11 is not a point light source but a surface light source, it cannot be positioned in the exact focal point of the parabolic reflection surface 21, but is positioned near the focal point of the parabolic reflection surface 21. Herein, it is assumed that the optical axis of the LED 10 is almost perpendicular to the main axis 26, but the present invention is not limited thereto. The light beams radiated from the LED chip 11 enter the collimators 20 through the concave portion 23. The light beams are reflected by the parabolic reflection surface 21 and then collimated so as to be nearly parallel with the main axis 26. The light beams travel through the light guide section 24, and are output from the light output surface 27. Here, "nearly collimated light" means all the light beams are output not from the focal point F but near the focal point F, because the LED chip 11 is in fact a surface light source.

If a plurality of collimators are provided, the single-line arrangement is not efficient, because the output surface becomes long. Therefore, a compact stacked arrangement is necessary. When collimators having the same dimensions are used, the focal points of the stacked collimators are not made to be on the same plane. Furthermore, the LEDs 10 at the focal points are not on the same plane. As a result, as shown in FIG. 2, the fixing member 30 for holding the LEDs 10 and the collimators 20 has one or more steps corresponding to the stacked collimators.

Between each LED 10 and each collimator 20, a member for matching refractive index (not shown) may be interposed, to eliminate an air gap between the LED 10 and the collimator 20. Preferably, but not necessarily, the refractive index of the member for matching refractive index is between those of the LED 10 and the collimator 20.

In this embodiment, although 12 LEDs 10 and 12 collimators are arranged in a fixing member 30 having 3 steps, each of which having 4 LEDs and 4 collimators on its top surface 31, the number of steps may vary depending on the number of stacked collimators.

Figure 5:
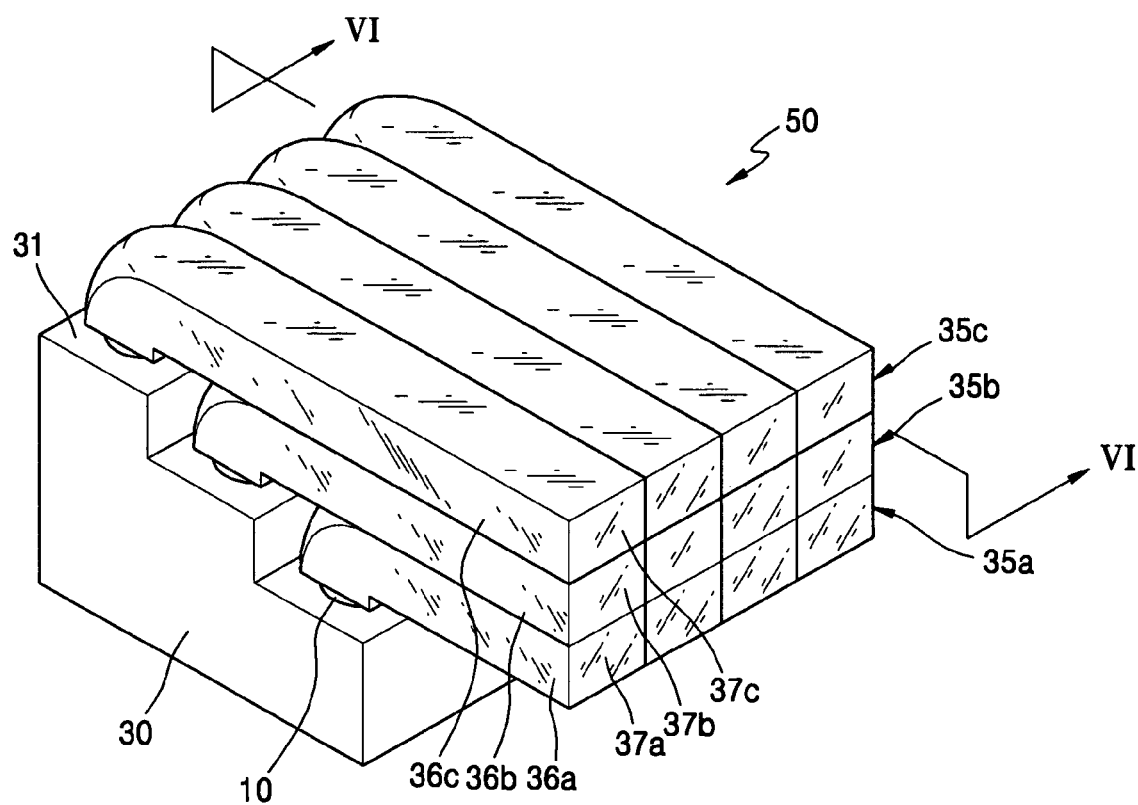
FIG. 5 is a perspective view of an example of an illuminating unit according to a second embodiment of the present invention.
Figure 6:
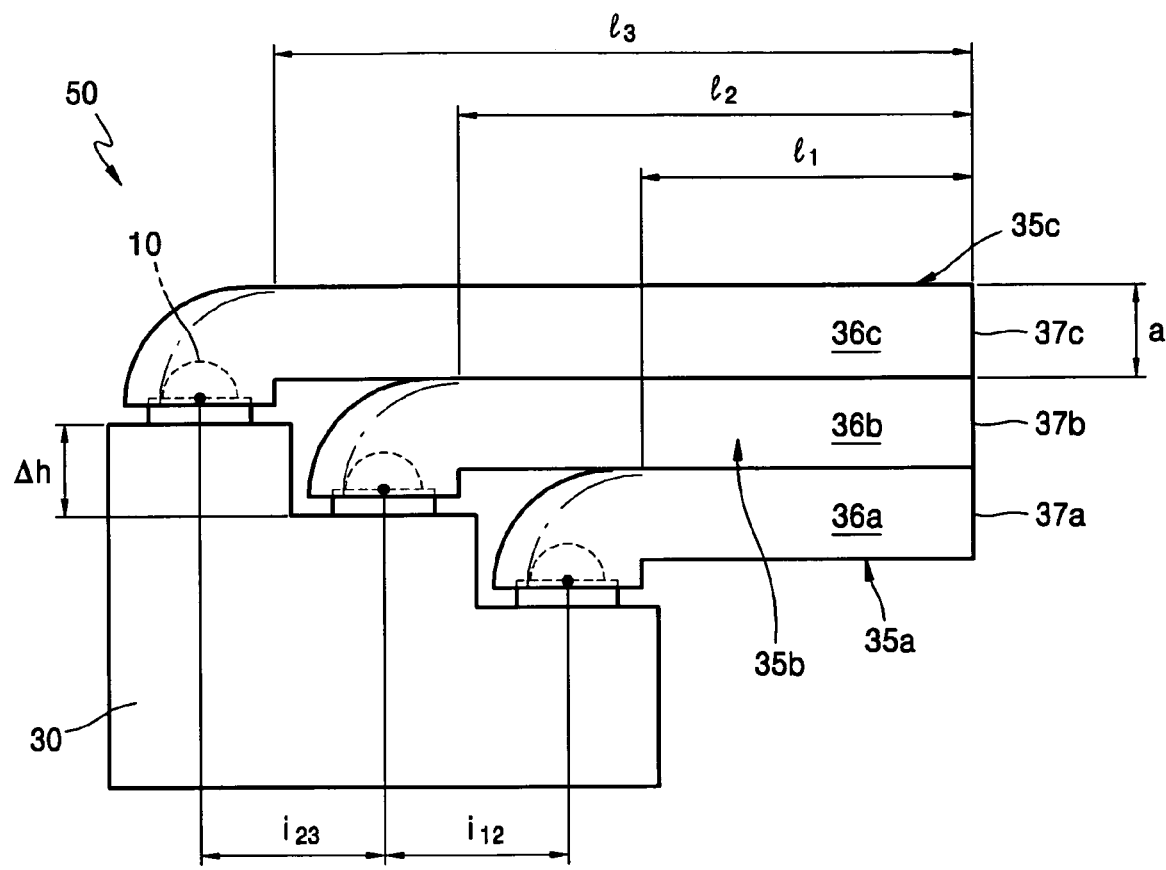
FIG. 6 is a cross-sectional view along a line VI-VI of FIG. 5.

FIG. 5 is a perspective view of an illuminating unit according to a second embodiment of the present invention, and FIG. 6 is a cross-sectional view along a line VI-VI of FIG. 5.

In the second embodiment, the fixing member 30 and the LEDs 10 have the same structure as in the first embodiment. Also, first through third collimators 35a, 35b, and 35c according to the second embodiment have the same structure as in the first embodiment, except that the lengths of the light guide sections 36a, 36b, and 36c are different.

Referring to FIGS. 5 and 6, the illuminating unit 50 includes a fixing member having a 3 step structure, a plurality of LEDs mounted on the top surfaces of each step, and first through third collimators 35a, 35b, and 35c.

The LEDs 10 are mounted on the top surfaces 31 of the steps. The first through third collimators 35a, 35b, and 35c are installed to cover the LEDs 10 so that the light beams from LEDs 10 can be collected. Also, the first through third collimators 35a, 35b, and 35c are aligned to direct the normal vectors of the first through third light output surfaces 37a, 37b, and 37c to the same direction.

Further, in order to simplify the configuration of the illuminating unit 50, the first through third light output surfaces 37a, 37b, and 37c are in the same plane. For this purpose, the first through third light guide sections 36a, 36b, and 36c of the first through third collimators 35a, 35b, and 35c have different lengths depending on which step they are mounted on. In other words, it is preferable, but not necessary, that the difference of the lengths 12-11 between the neighboring first and second light guide sections 36a and 36b, or the difference of the lengths 13-12 between the neighboring second and third light guide sections 36b and 36c, is equal to the horizontal interval i12 or i23 between corresponding LEDs 10, where 11, 12, and 13 respectively denote the lengths of the first through third light guide sections 36a, 36b, and 36c.

Furthermore, it is preferable, but not necessary, that the vertical interval Δh between neighboring LEDs 10 is equal to the thickness a of each of the first through third light guide sections 36a, 36b, and 36c, so that the first through third light output surfaces 37a, 37b, and 37c can meet without a gap. Since the LEDs 10 are installed on the top surface 31 of the fixing member 30, the vertical interval Δh between the neighboring LEDs 10 corresponds to the difference of heights of the stepped top surface 31 of the fixing member 30.

Figure 7:
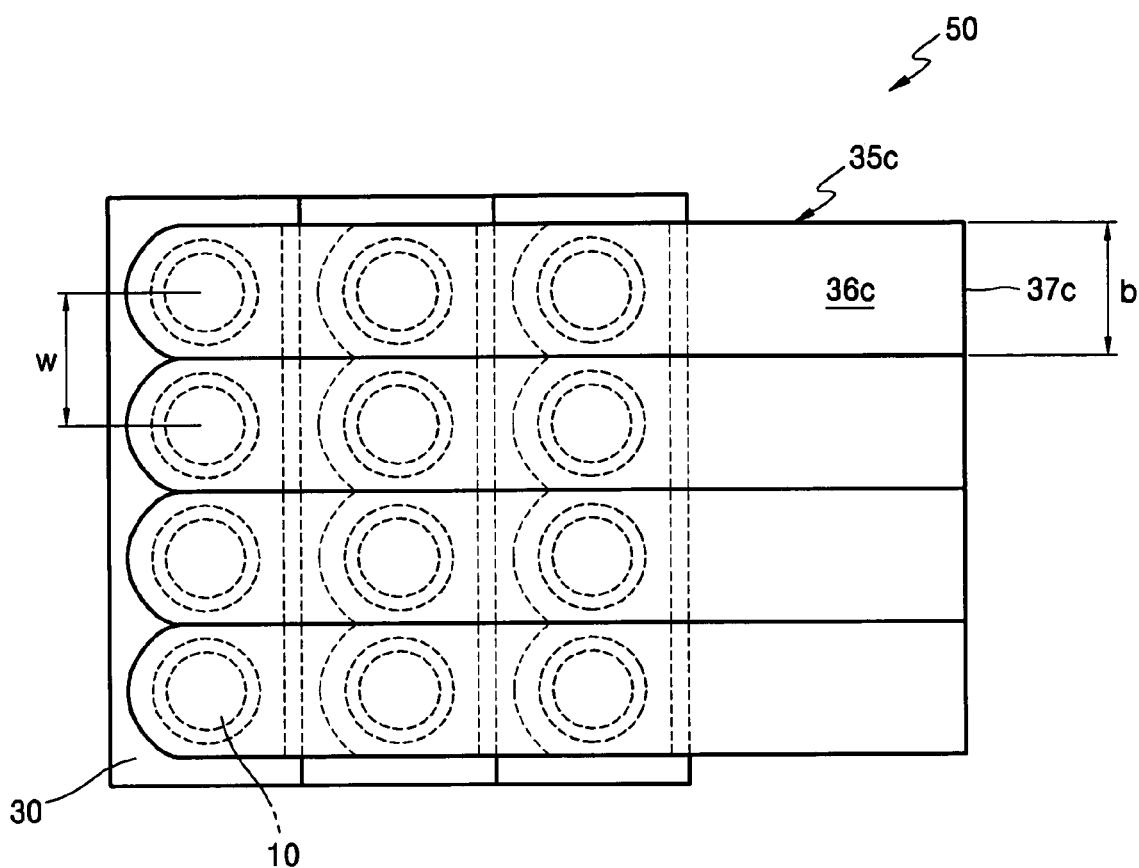
FIG. 7 is a plan view of FIG. 6.

FIG. 7 is a plan view of FIG. 5. Preferably, but not necessarily, the interval w between neighboring LEDs 10 on the same step is equal to the width b of each of the first through third light guide sections 36a, 36b, and 36c, so that the first through third light output surfaces 37a, 37b, and 37c on the same step can meet without a gap.

As described above, the vertical interval Δh between neighboring LEDs 10 is equal to the thickness a of each of the first through third light guide sections 36a, 36b, and 36c, and the interval w between LEDs 10 mounted on the same step is equal to the width b of each of the first through third light guide sections 36a, 36b, and 36c. As a result, the first through third light output surfaces 37a, 37b, and 37c can meet without a gap.

When a plurality of high brightness LEDs are used as a light source, they can generate significant heat. To prevent thermal damage, the fixing member 30 according to the present invention has a lower thermal concentration than a conventional fixing member in which the LEDs are arranged on the same plane. To aid in heat dissipation, the fixing member 30 may be made from a metallic material having high thermal conductivity, in order to efficiently discharge the heat.

Figure 8:
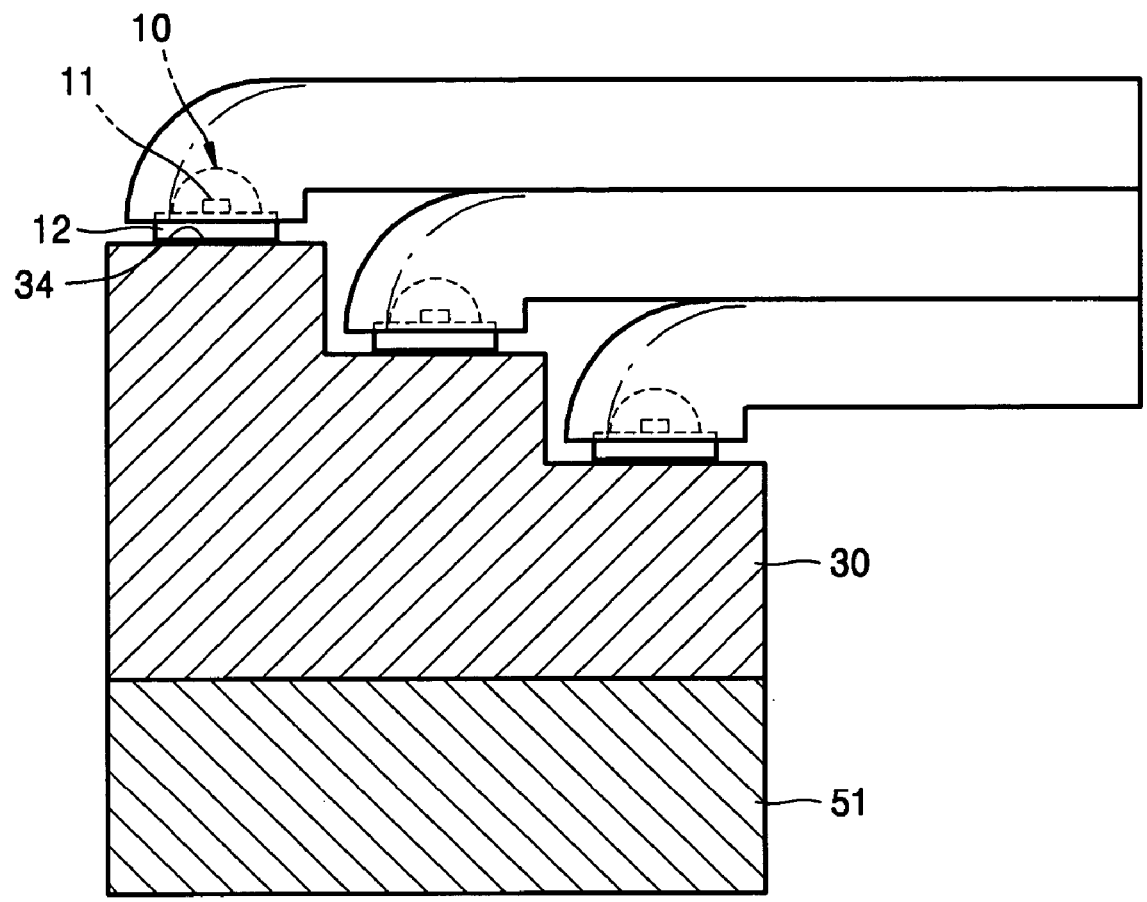
FIG. 8 illustrates an illuminating unit further comprising a heat sink according to an example of an embodiment of the present invention.

Further, as shown in FIG. 8, a heat sink 51 may be provided on the bottom surface of the fixing member 30. Also, in order to reduce thermal resistance, the fixing member 30 may be bonded to the heat sink 51 without a gap, and they may be coated with a high thermal conductive material. For more efficient cooling, the heat sink 51 may be provided with an air-type or water-type cooling device. Otherwise, the fixing member 30 may function as a heat sink by itself.

To efficiently discharge the heat generated by the LED chips 11, it is preferable, but not necessary, to bond the bottom surface of the substrate 12 to the top surface 31 of the fixing member 30 without an air gap. Further, it is preferable, but not necessary, that a heat transfer layer 34 having high thermal conduction is interposed between the substrate 12 and the top surface 31.

Figure 9:
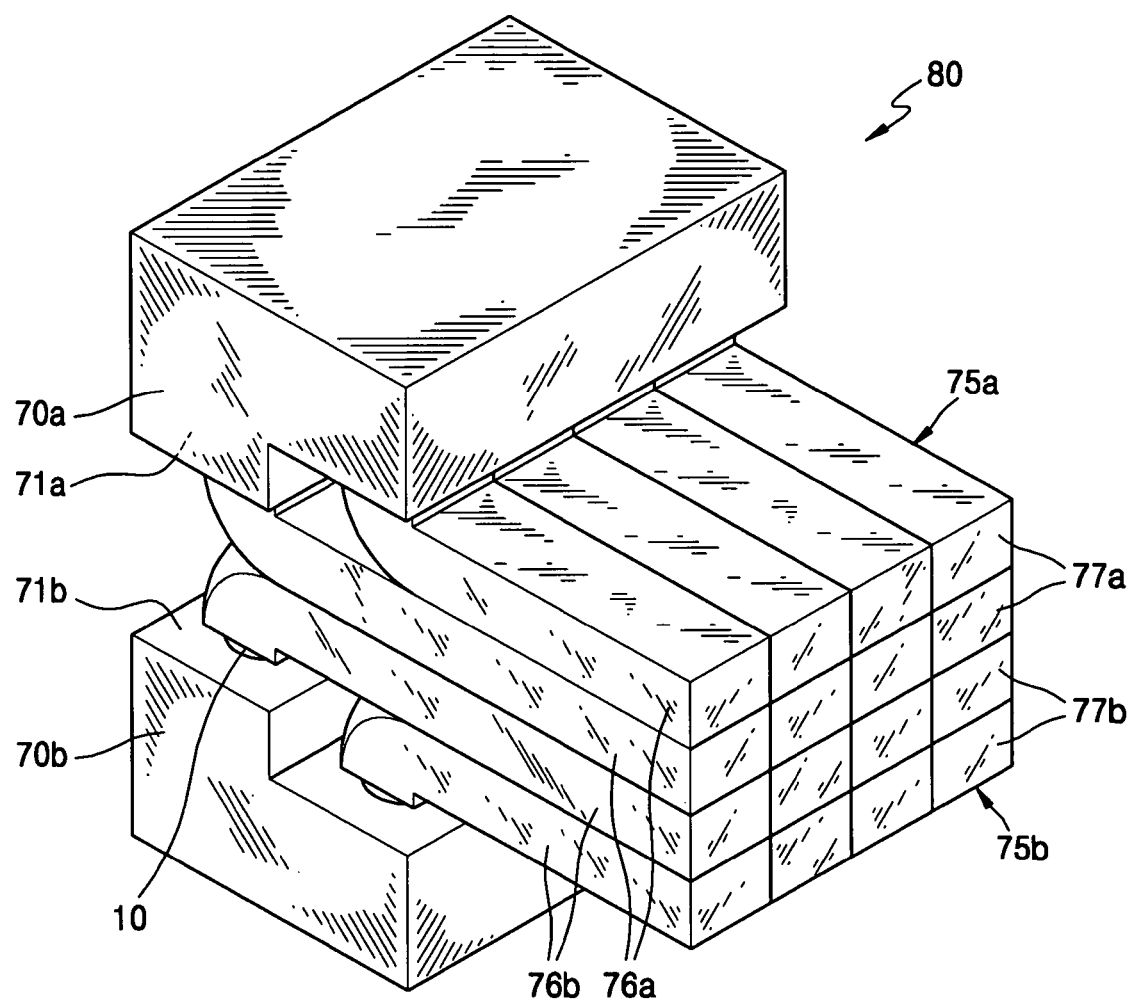
FIG. 9 is a perspective view of an illuminating unit having first and second fixing members according to a third embodiment of the present invention.

FIG. 9 is a perspective view of an illuminating unit 80 having first and second fixing members 70a and 70b according to a third embodiment of the present invention.

The illuminating unit 80 according to the third embodiment of the present invention includes LEDs 10, upper and lower collimators 75a and 75b, and first and second fixing members 70a and 70b having a 2-step structure. The first stepped top surface 71a of the first fixing member 70a faces the second stepped top surface 71b of the second fixing member 70b.

The LEDs 10 used in this embodiment have the same configuration as those used in the first embodiment, and the upper and lower collimators 75a and 75b also have the same configuration as those used in the first embodiment, except for the lengths of the light guide sections. In comparison with the first and second embodiments, the first and second fixing members 70a and 70b according to the third embodiment have a 2-step structure.

The light guide sections of the upper and lower collimators 75a and 75b may have different lengths, so that the upper and lower light output surfaces 77a and 77b can be on the same plane.

The LEDs 10 are installed on the first and second top surfaces 71a and 71b of each step, and the upper and lower collimators 75a and 75b are installed to cover the LEDs 10 and direct the normal vectors of the upper and lower light output surfaces 77a and 77b to the same direction. The upper and lower collimators 75a and 75b are located between the facing first and second fixing members 70a and 70b. The distance between the first and second fixing members 70a and 70b is such that the upper and lower light output surfaces 77a and 77b can meet without a gap.

Although the aforementioned first and second fixing members 70a and 70b have a 2-step structure, they may have a different number of steps as necessary according to the present invention.

The heights of the steps of the first and second fixing members 70a and 70b or the intervals between the LEDs 10 mounted on the same step are the same as those of the first embodiment as described above. Therefore, their detailed descriptions will not be repeated.

Although the first and second fixing members 70a and 70b are upper and lower fixing members, respectively, in this embodiment, the members 70a and 70b may be the lower and upper fixing members, respectively. Further, although the illuminating unit according to the third embodiment has two fixing members, the number of fixing members according to the present invention is not limited thereto, and may be more than two. For example, when the illuminating unit has four fixing members, the fixing members may be arranged in such a way that the surfaces for mounting the LEDs and collimators in each fixing member face each other so that the collimators can be collected in the space defined by the four fixing members.

Although the first through third embodiments have been described assuming that LEDs are used as light emitting devices, the present invention is not limited thereto. Instead, a variety of small light sources can be used, such as organic electroluminescent devices, laser diodes, or field emission devices.

As described above, since a plurality of light emitting sources and collimators are mounted on a fixing member or fixing members having a stepped structure, they can be effectively arranged in a smaller space, and the thermal concentration of a plurality of light emitting sources can be reduced. Furthermore, it is possible to provide a compact illuminating unit by adopting reflective collimators and small light emitting devices such as LEDs.

Figure 10:
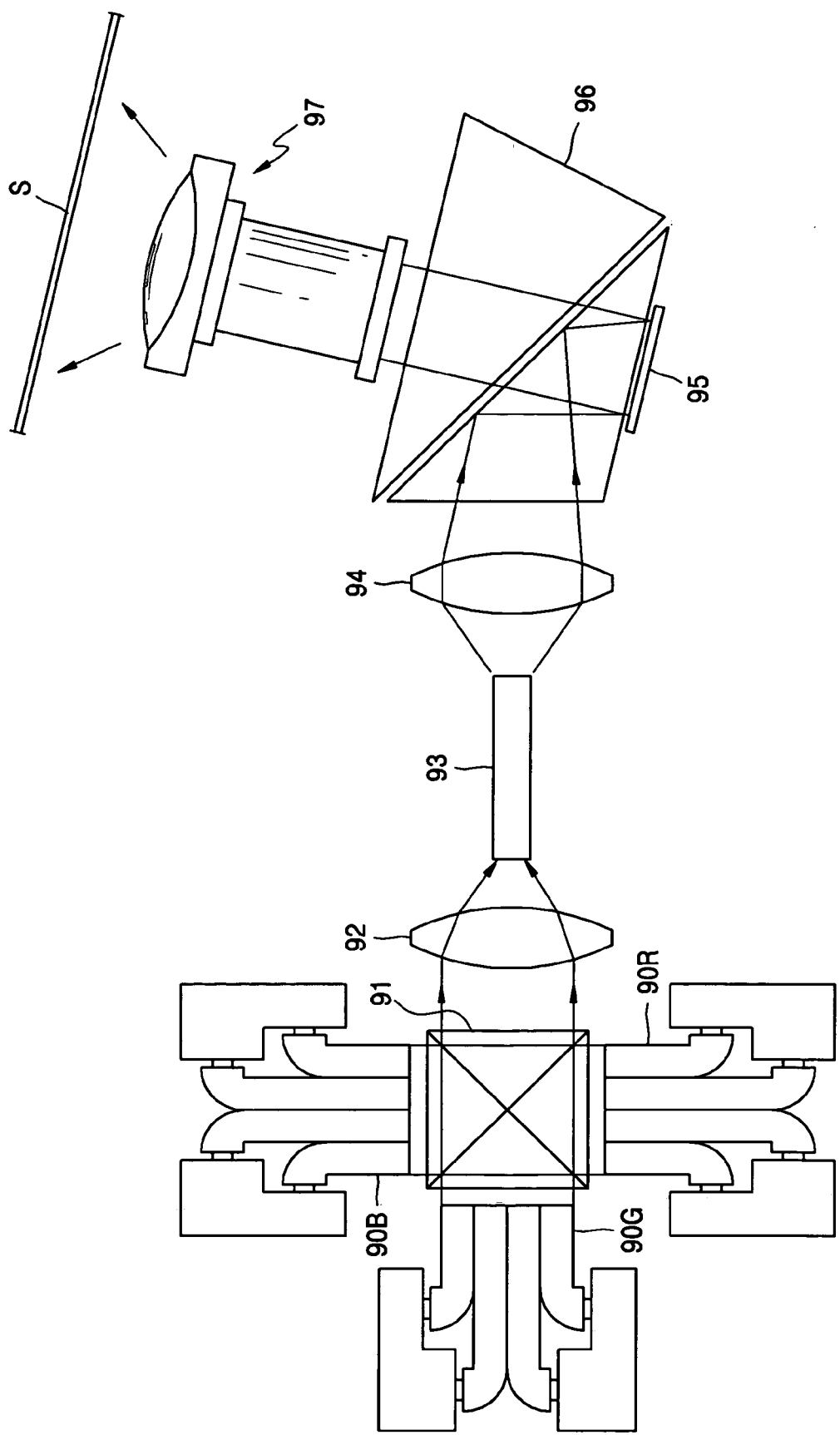
FIG. 10 is a schematic diagram of a projection type image display apparatus according to an example of an embodiment of the present invention.

A projection type image display apparatus adopting the aforementioned illuminating units according to the present invention will now be described. FIG. 10 is a schematic diagram of a projection type image display apparatus according to an example of an embodiment of the present invention, which includes first through third illuminating units 90R, 90G, and 90B for emitting light beams of first through third wavelengths, an optical modulator 95, and a projection lens unit 97. The first through third illuminating units 90R, 90G, and 90B may output red, green, and blue (RGB) light beams, for example. Each of the first through third illuminating units 90R, 90G, and 90B may have, for example, 16 LEDs arranged as shown in FIG. 8, 16 collimators corresponding to the LEDs, and a fixing member for mounting the LEDs and collimators. The optical modulator 95 sequentially modulates the red, green, and blue light beams output from the first through third illuminating units 90R, 90G, and 90B, based on image data. For example, a digital micro-mirror device (DMD) may be used as an optical modulator 95. Though a single panel projector using a reflective optical modulator is adopted in the projection type image display apparatus according to this embodiment, a projector using a non-reflective optical modulator such as a liquid crystal panel can also be used.

The red, green, and blue (RGB) light beams sequentially output from the first through third illuminating units 90R, 90G, and 90B are guided by an X-cube prism 91 onto a common optical path and then input to an integrator 93. The integrator 93 generates surface light beams having a uniform light intensity. The integrator 93 may be a glass rod having a rectangular cross-section, or an optical tunnel having an internal reflection surface. The collector lens unit 92 collects the light beams and outputs them to the integrator 93. The light beams output from the integrator 93 are input to the optical modulator 95 via a total internal reflection (TIR) prism 96. A relay lens unit 94 magnifies or reduces the light beams from the integrator 93 according to the size of the opening of the optical modulator 95. The optical modulator 95 sequentially modulates the red, green, and blue (RGB) light beams based on the image data. The modulated light beams are guided to a projection lens unit 97 by the TIR prism 96. The projection lens unit 97 magnifies the modulated light beams and projects them onto a screen S.

According to the projection type image display apparatus of the present invention, it is possible to compactly arrange a plurality of light emitting devices and collimators by adopting light emitting devices and collimators mounted on the fixing member having the stepped structure. Thus, it is possible to provide a small, compact projection type image display apparatus. Further, it is possible to increase the lifetimes of the first through third illuminating units 90R, 90G, and 90B by adopting small light emitting devices such as LEDs 10 as a light source.

In the illuminating unit according to the present invention, a plurality of light emitting devices and collimators having reflective surfaces are mounted on a fixing member or fixing members having a stepped structure. Therefore, it is possible to effectively discharge the heat generated in a plurality of light emitting devices and attenuate thermal concentration. Further, it is possible to significantly increase a lifetime of the illuminating unit by adopting LEDs as a light source.

In the projection type image display apparatus according to the present invention, an illuminating unit having light emitting devices mounted on a fixing member or fixing members having a stepped structure and collimators is adopted. Therefore, it is possible to provide a small projection type image display apparatus by compactly arranging a plurality of light emitting devices and collimators.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An illuminating unit comprising:
   a plurality of light emitting devices which output light beams having predetermined wavelengths;
   a plurality of collimators, each having a parabolic reflection surface for reflecting the light beams in a predetermined direction, a mounting section for locating a corresponding one of the light emitting devices at the focal point of the parabolic reflection surface, a light output surface opposite to the parabolic reflection surface, and a light guide section for guiding the light beams reflected from the parabolic reflection surface to the light output surface; and
   at least one fixing member having at least two steps for mounting thereon the light emitting devices and the collimators.

2. The illuminating unit according to claim 1, wherein the at least one fixing member includes a first fixing member having a first top surface and a second fixing member having a second top surface, and the first top surface faces the second top surface.

3. The illuminating unit according to claim 1, wherein the light guide section is a rectangular post having a rectangular cross-section.

4. The illuminating unit according to claim 1, wherein the light output surfaces of the plurality of collimators are on the same plane.

5. The illuminating unit according to claim 4, wherein a length difference between light guide sections of the plurality of collimators mounted on neighboring steps is equal to a horizontal interval between the light emitting devices mounted on neighboring steps.

6. The illuminating unit according to claim 4, wherein the light output surfaces meet each other without a gap.

7. The illuminating unit according to claim 6, wherein a vertical interval between the light emitting devices mounted on neighboring steps is equal to the thickness of the light guide section.

8. The illuminating unit according to claim 6, wherein the interval between neighboring light emitting devices mounted on each step is equal to the width of the light guide section.

9. The illuminating unit according to claim 1, wherein the at least one fixing member is made from a high thermal conductive material such as a metal.

10. The illuminating unit according to claim 1, wherein a heat sink is provided on a bottom surface of the at least one fixing member.

11. The illuminating unit according to claim 1, wherein a bottom surface of the corresponding light emitting device makes contact with a top surface of a corresponding one of the steps without an air gap.

12. The illuminating unit according to claim 1, wherein a heat transfer layer is interposed between a substrate of the corresponding light emitting device and a top surface of a corresponding one of the steps.

13. The illuminating unit according to claim 1, wherein each of the light emitting devices comprises at least one of a light emitting diode (LED), a laser diode, an organic electroluminescent device, and a field emission device.

14. A projection type image display apparatus comprising: a plurality of illuminating units for outputting light beams of different wavelengths; at least an optical modulator for modulating the light beams from the illuminating units based on image data; and a projection lens unit for magnifying and projecting the light beams output from the optical modulator, wherein
the illuminating unit comprises:
a plurality of light emitting devices which output light beams of different wavelengths;
a plurality of collimators, each having a parabolic reflection surface for reflecting the light beam in a predetermined direction, a mounting section for locating a corresponding one of the light emitting devices at the focal point of the parabolic reflection surface, a light output surface opposite to the parabolic reflection surface, and a light guide section for guiding the light beams reflected from the parabolic reflection surface to the light output surface; and
at least one fixing member having at least two steps for mounting thereon the light emitting devices and the collimators.

15. The projection type image display apparatus according to claim 14, wherein the at least one fixing member includes a first fixing member having a first top surface and a second fixing member having a second top surface, and the first top surface faces the second top surface.

16. The projection type image display apparatus according to claim 14, wherein the light guide section is a rectangular post having a rectangular cross-section.

17. The projection type image display apparatus according to claim 14, wherein the light output surfaces of the plurality of collimators are on the same plane.

18. The projection type image display apparatus according to claim 17, wherein a length difference between light guide sections of the plurality of collimators mounted on neighboring steps is equal to a horizontal interval between the light emitting devices mounted on neighboring steps.

19. The projection type image display apparatus according to claim 17, wherein the light output surfaces meet each other without a gap.

20. The projection type image display apparatus according to claim 19, wherein a vertical interval between the light emitting devices mounted on neighboring steps is equal to the thickness of the light guide section.

21. The projection type image display apparatus according to claim 19, wherein the interval between neighboring light emitting devices mounted on each step is equal to the width of the light guide section.

22. The projection type image display apparatus according to claim 14, wherein the at least one fixing member is made from a high thermal conductive material such as a metal.

23. The projection type image display apparatus according to claim 14, wherein a heat sink is provided on a bottom surface of the at least one fixing member.

24. The projection type image display apparatus according to claim 14, wherein a bottom surface of the corresponding light emitting device makes contact with a top surface of a corresponding one of the steps without an air gap.

25. The projection type image display apparatus according to claim 14, wherein a heat transfer layer is interposed between a substrate of the corresponding light emitting device and a top surface of a corresponding one of the steps.

26. The projection type image display apparatus according to claim 14, wherein each of the light emitting devices comprises at least one of a light emitting diode (LED), a laser diode, an organic electroluminescent device, and a field emission device.

* * * * *